Dec. 28, 1965    H. R. BLACK    3,225,928
ENDLESS BELT FILTER
Filed Jan. 16, 1962    4 Sheets-Sheet 1

INVENTOR.
HUGH R. BLACK.
BY
Robert A. Sloman
ATTORNEY

INVENTOR.
HUGH R. BLACK

Dec. 28, 1965          H. R. BLACK          3,225,928
ENDLESS BELT FILTER
Filed Jan. 16, 1962          4 Sheets-Sheet 3
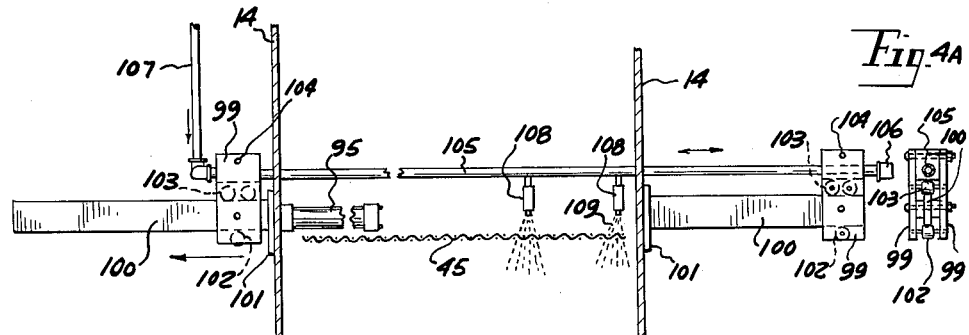
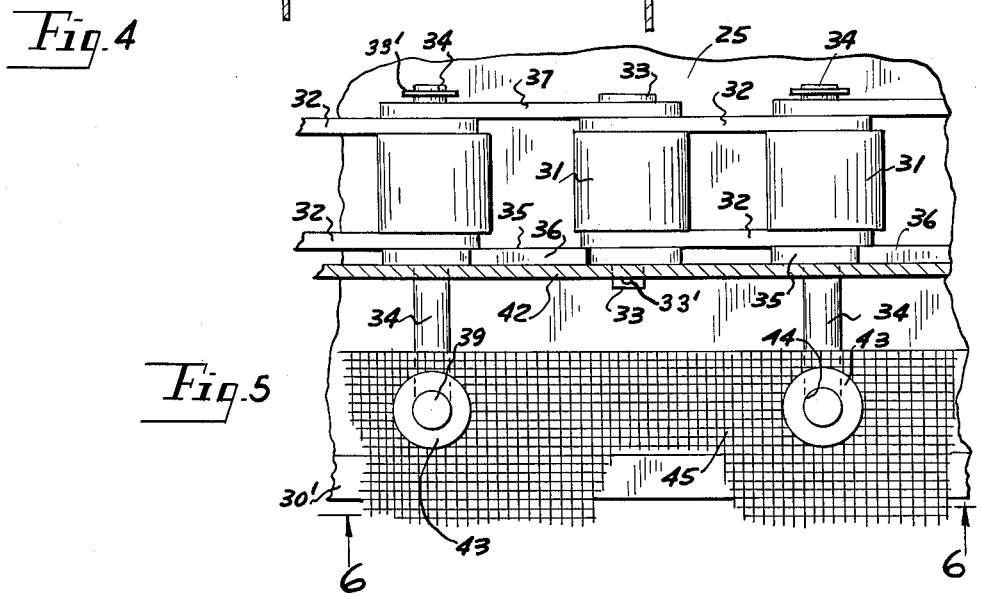
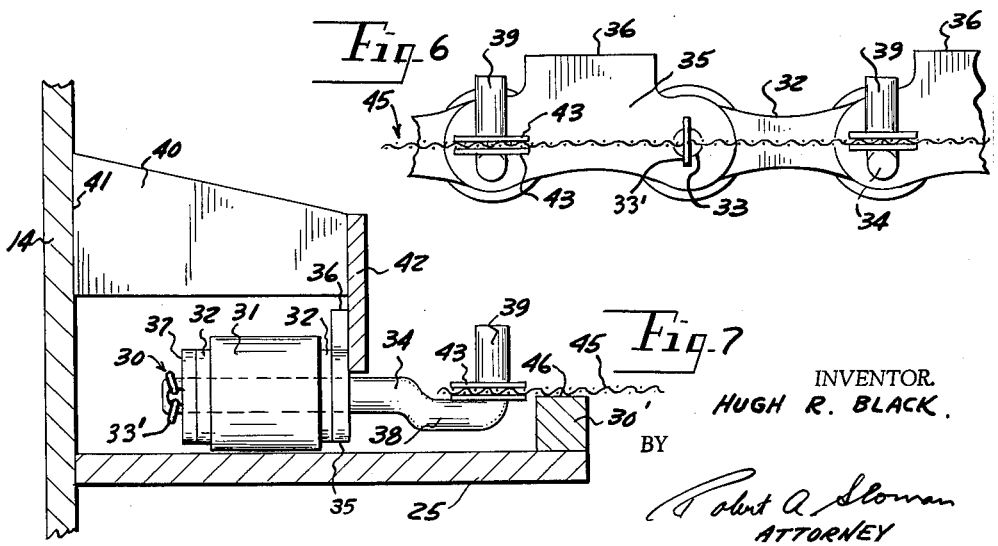
INVENTOR.
HUGH R. BLACK.
BY
Robert A. Sloman
ATTORNEY INVENTOR.
HUGH R. BLACK
BY
*Robert C. Sloman*
ATTORNEY United States Patent Office 3,225,928
Patented Dec. 28, 1965

3,225,928
ENDLESS BELT FILTER
Hugh R. Black, Birmingham, Mich., assignor to H. R. Black Company, Detroit, Mich., a Michigan copartnership
Filed Jan. 16, 1962, Ser. No. 166,521
19 Claims. (Cl. 210—121)

This invention relates to a filtration of fluids containing impurities for the purpose of recirculation or other purposes.

Heretofore, there has long existed the problem of effectively removing solids and floating contaminates from fluids, or other impurities therein used in industrial processing, as for example, from the cleaning stage of a phosphate washer. Problems also have existed in removing paint sludge from the fluids employed in spray booths, a problem in connection with the maintenance of spray booths, which has been a constant headache and a very costly problem.

Other problems have existed providing an effective means of employing a continuous movable filter screen together with means for cleaning off the surface of the screen and separating therefrom the particles of impurities which have been separated from the fluid being filtered. Various methods have been employed in the past for washing down the screen with air or water, or other fluids, most of which efforts heretofore have been unsatisfactory, or costly.

It is also discovered that in filtration devices oftentimes minute particles, paint or other substances escape in the initial filtration process, and in situations where the fluid is reused, these minute particles may be reapplied to work pieces and thus produce difficult cleaning problems, or for the production of poor work. These minor particles normally float upon the top of the solution after filtration.

It is accordingly one of the objects of the present invention to provide in conjunction with the delivery of initially filtered fluids of an automatic skimmer mechanism by which all particles which have escaped or passed through the filtration assembly may be skimmed from the filter fluid and recirculated for refiltration.

It is another object of the present invention to provide an automatic skimmer float control, such as might be used in conjunction with a spray booth pump, for illustration, and employing a suction means by which scum and other impurities floating at the top surface of the filtered fluid may be withdrawn from recirculation and reprojected through the filtering process.

It is another object of the present invention to provide a novel form of automatic form of filter screen assembly wherein opposed guide means are employed for supportably receiving drive chains, and wherein a continuous filter belt is movably positioned over the said guide means and connected to the said chains for movement in unison.

It is a further object of the present invention to provide a novel power drive mechanism in conjunction with the chain drive for the filter belt, together with novel means for guiding the sprocket chains, for retaining the same and for securing the filter to the said sprocket chains for movement in unison.

These and other objects will be seen from the following specification and claims in conjunction with the appended drawings in which:

FIG. 4 is a fragmentary section taken on line 4—4 of FIG. 2, on an increased scale.

FIG. 4A is an end view thereof.

FIG. 5 is a fragmentary section taken on line 5—5 of FIG. 2 on an increased scale.

FIG. 6 is a fragmentary elevational view, taken on line 6—6 of FIG. 5.

FIG. 7 is a fragmentary section taken on line 7—7 of FIG. 2, on an increased scale.

It will be understood that the above drawings illustrate merely a preferred embodiment of the present invention by way of illustration, and that other embodiments are contemplated within the scope of the claims hereinafter set forth.

Figures 1, 2:
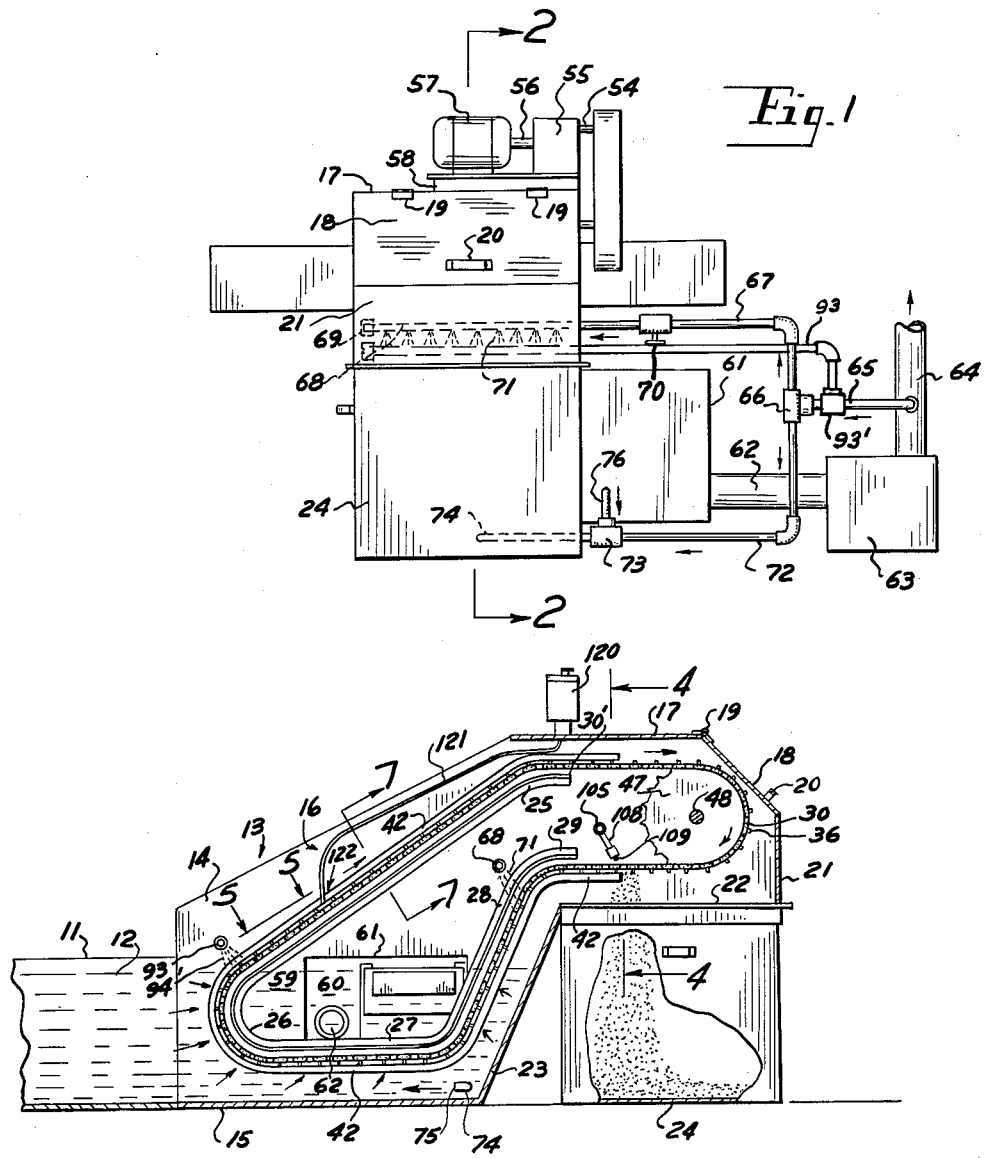
FIG. 1 is a fragmentary front elevational view of the present automatic filter screen assembly.
FIG. 2 is a fragmentary section taken on line 2—2 of FIG. 1, showing the present automatic screen assembly as associated with a tank with fluid containing impurities to be filtered therefrom.
Figure 3:
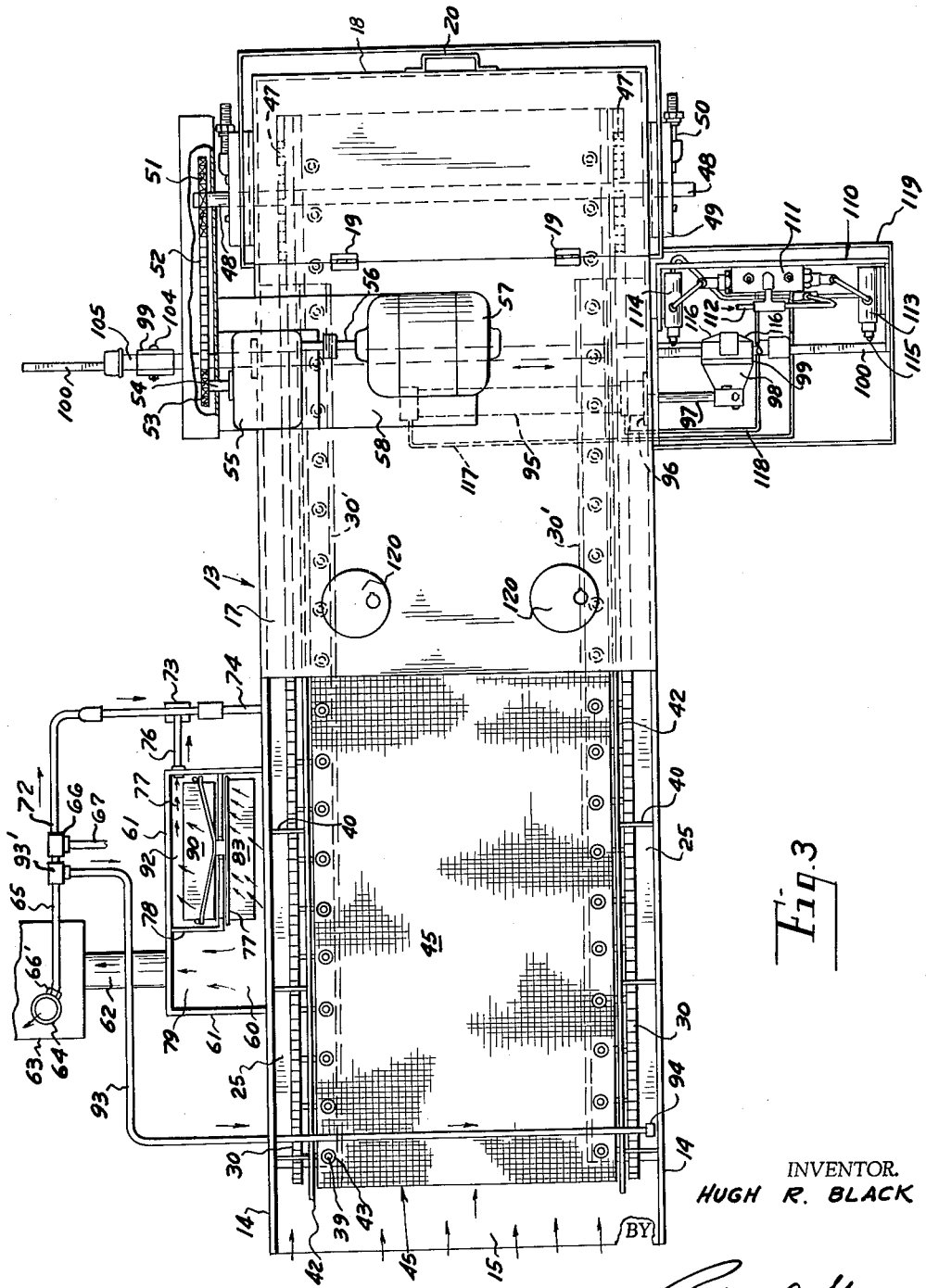
FIG. 3 is a plan view thereof on an increased scale.

In FIGS. 1, 2 and 3 of the drawing, the tank 11, fragmentarily shown, receives fluid 12 containing impurities sought to be filtered by the present automatic filter screen assembly. The filter housing generally indicated at 13 is in communication with the interior of tank 11 and the fluid 12 therein and includes the opposed upright side walls 14 and bottom wall 15. A portion of the filter housing is open at its top as at 16, said side walls extending above the level of fluid 12, and terminating in top wall 17. The downwardly inclined inspection cover 18 hinged at 19 merges with end wall 21 connected to apertured bottom wall portion 22, below which is removably positioned the sludge collecting receptacle 24, FIG. 2.

The filter housing also includes the inclined wall 23, which terminates in the bottom wall 15 of the housing.

As best shown in FIGS. 2 and 3 there is provided a pair of oppositely arranged continuous guide flanges which are mounted on and project inwardly from each of the side walls 14 to define the opposed looped guides portions of which are indicated at 25, FIG. 2 as being above the fluid level 12, and with portions of the said guides extending below the fluid level as at the reversely curved portions 26, FIG. 2, forwardly extending portions 27, inclined portions 28, and the horizontally disposed end portions 29.

The respective ends 25–29 of each of said guide flanges are spaced longitudinally of the top and bottom of the respective sprockets 47, FIG. 2 hereinafter described.

A continuous sprocket chain 30, FIGS. 2 and 3, is movably guided on and around each of the said guide flanges and a corresponding sprocket 47, FIG. 2. The said sprocket chains, as best illustrated in FIGS. 5, 6, and 7, include the individual roller elements 31, and the conventional spacer links 32. The pivotal connections for the respective chain elements 31 are in the form of inwardly extending pins 33, which are short and the alternately arranged pivot pins 34, which as hereafter described provide the means of connection of the filter screen 45 with the said chains respectively. Suitable cotter pins 33' are employed to retain rollers 31 relative to pins 33 and 34.

Some of the chain segments 31 include the connector links 35, shown in FIG. 6, which have radial projections 36, which slidably bear against the inner surface of the guard rail 42, as best shown in FIG. 7, for the purpose as hereinafter described, of retaining the said chains 30 in a continuous outermost planer position and for holding the edges of the screen taut. Additional connector links for the chain segments 31 are indicated at 37 to complete the chain construction, as best shown in FIGS. 5 and 7.

Inner portions of the connector pins 34 which form a part of the chain assembly, and as best shown in FIG. 7, are laterally offest as at 38, and terminate in the pin radial supports 39. A series of longitudinally spaced grommets 43, apertured at 44, are arranged along the outer longitudinal edges of the filter screen 45 and fixedly secured therethrough, as best shown in FIG. 7. These grommets 43 are projected over the pin radial supports 39 by which the continuous filter belt 45 of a suitable wire mesh is fixedly secured at spaced portions throughout its length to corresponding adjacent portions of the respective sprocket chains 30 to provide the means for effective continuous movement of the said filter screen 45, as hereinafter described.

The above described guard rail 42 is spaced inwardly from and parallel to and mounted on each of the side walls 14 in a manner best shown in FIG. 7 by means of a series of longitudinally spaced bracket plates 40, which at their inner upright edges are fixedly secured as at 41 to interior portions of the side walls 14, as by welding, for illustration.

The inwardly directed pins 33 and 34, which form a part of the sprocket chain assembly are so arranged as to be slidably and guidably retained with respect to the bottom or undersurface portion of the guard rail 42 in order to maintain the sprocket chains respectively along the outer surfaces of the guide flanges 25, 26, 27, 28, 29, throughout the continuous movements of the said chains and throughout their length to the extent the said chains engage the said guide flanges, as best shown in FIG. 2.

Accordingly, it appears that the guard rails 42 perform two functions:
(1) The holddown function of maintaining the sprocket chains in assembled relation with respect to the guide flanges 25, 26, 27, 28, 29
(2) Additionally in view of the connectors 35, shown in FIG. 6, with radial projections 36, it is seen that said projections 36 cooperatively and slidably engage the interior surface portions of the guard rails 42 for maintaining the respective chains 30 in a planar relationship and at the same time are so arranged as to hold the assembled continuous filter screen 45 in a taut position.

A continuous sealing bar 30' of stainless steel, or the like, is mounted on and projected radially outward of the inner edge of each of the flanges, with outer edge portions of the screen 45 as at point 46, FIG. 7 operatively bearing against the said sealing bar 30' in order to prevent the passage of impurities laterally outward from the filtration chamber 59 upon the interior of the continuous filter screen. As best shown in FIG. 2, inasmuch as the sealing bar 30' extends radially outward from the inner edge portions of the guide flanges, throughout the length of the said guide flanges, it is seen that there is provided an effective seal for the outer edge portions of the filter screen throughout continuous movements thereof through the body of fluid upon the interior of the filter housing.

A pair of spaced power driven sprockets 47 are journaled within the housing 13 adjacent respective side walls 14 and above the fluid level by means of the power driven shaft 48, which is best shown in FIGS. 2 and 3, is rotatively mounted within the respective journal box assemblies 49–50, mounted upon the exterior of the filter housing. The adjustability of the said journal boxes provides a means for regulating the tautness of the filter screen longitudinally of its length and at the same time of course the tension in the respective sprocket chains 30.

As best shown in FIG. 3, means of transmitting rotative power to the said sprockets is provided. In this connection there is shown a gear 51 upon one end of shaft 48, which through chain 52 joins gear 53 on output shaft 54 of speed reducer 55, which is mounted upon the support platform 58 upon the top wall 17 of the filter housing.

The input shaft of the said speed reducer 55 is connected to the driven shaft 56 of the electric motor 57, also mounted upon the support 58, as best illustrated in FIGS. 1 and 3. There is thus provided means for effecting a power drive between the said motor 57 and the sprockets 47, FIG. 2, for driving the continuously movable chains 30 and the assembled and associated continuous filter belt 45.

The filter belt is of a suitable wire mesh and is preferably constructed of stainless steel or the like, with the specific mesh thereof to be determined by the nature of the impurities to be filtered from the fluid 12.

In the operation of the present automatic filter screen, the fluid 12 from tank 11 containing impurities passes into the interior of the filter housing 13, and through portions of the continuously movable filter belt 45, either from the side, from the back, or the bottom thereof, in order to enter the filtration chamber 59. The fluid leaves the filter housing through a suitable outlet into the outlet box 61, which is arranged upon one side of the filter housing, as best shown in FIG. 3, and on an enlarged scale in FIGS. 8, 9 and 10.

Figure 8:
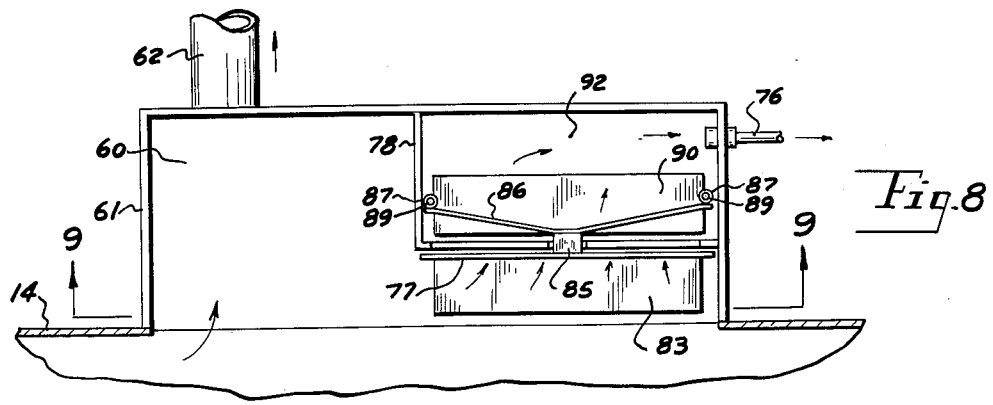
FIG. 8 is a plan view of the fluid outlet box shown in FIG. 3, on an increased scale, as associated with a portion of the filter housing, fragmentarily shown.
Figure 9:
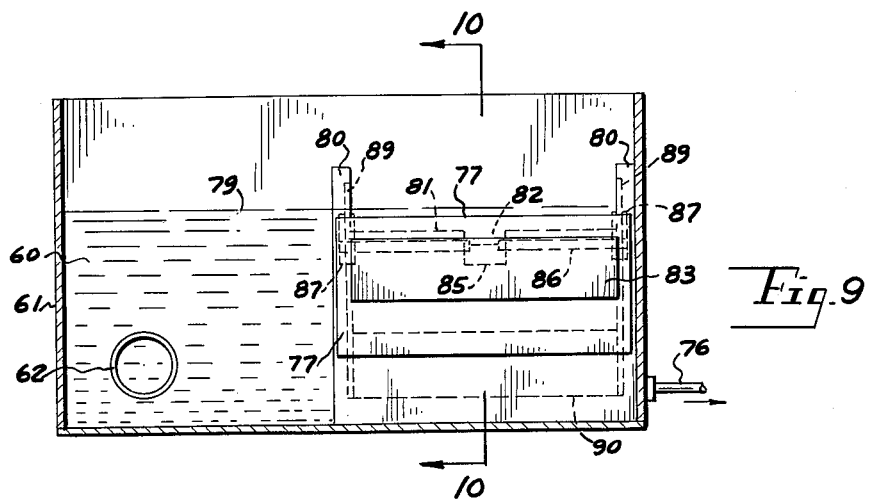
FIG. 9 is a section taken on line 9—9 of FIG. 8.

The said outlet box 61 collects the fluid, as indicated at 60, and has an outlet conduit 62 connected thereto adjacent its lower end, as best shown in FIGS. 8 and 9 for delivery of the fluid to a power operated recirculation pump assembly, generally indicated at 63, FIGS. 1 and 3. The said recirculation pump 63 receives the filtered fluid and directs the same upwardly through the delivery pipe 64 for recirculation into the commercial apparatus for which it is adapted, as for example a paint spray booth, or cleaning chamber used in an industrial process.

A branch pipe 65 is connected with delivery pipe 64, through a suitable T connection 66', shown in FIG. 3. The branch 65, through T 66 joins a fluid flushing header pipe 67 terminating in the delivery pipe 68 upon the interior of the filter housing, as best shown in FIG. 2. Here the pipe 68, which is closed at its end at 69, FIG. 1, has along its undersurface a series of longitudinally spaced jet outlets 71 which extend across the width of the filter screen 45 along the lower portion thereof for the purpose of washing down the said filter screen and for removing particles therefrom, as shown in FIG. 2 to serve the primary purpose of flushing the screen to the extent that flushing may be needed. As shown in FIG. 1 a suitable hand valve 70 is interposed in the conduit 67 for regulating, controlling or shutting off the delivery of fluid under pressure through the flushing header 68 and its jet outlets 71, FIG. 2.

Another branch of the delivery pipe 65 as at 72, extends from the T fitting 66, FIG. 1, and joins the suction T 73 and projects into the body of the filter housing for the recirculation of pressure fluid thereinto as at 74, FIG. 2 and FIG. 3. The T fitting 73 is in the nature of a suction T for withdrawing fluid through the connected pipe 76, which joins the outlet adjacent the bottom portion of the skimmer housing 78 for the withdrawal of skimmed fluid 92 therein.

The operation of the suction T 73 by virtue of the fluid under pressure moving through the pipes 72–74 provides a means of creating a low pressure condition for the purpose of draining continuously skimmed fluid from the skimmer tank 78 and through the outlet pipe 76, connected to the said suction T, as best shown in FIGS. 1 and 3.

It was discovered during the operation of the present automatic filter screen that minute particles of paint or other impurities in some conditions escape through the screen and into the outlet box 61 and floated to the top of the fluid therein as at 79, FIG. 9. Accordingly in order to prevent recirculation of these impurities, it was necessary to provide a means of skimming such scum from the top surface at 79.

Figure 10:
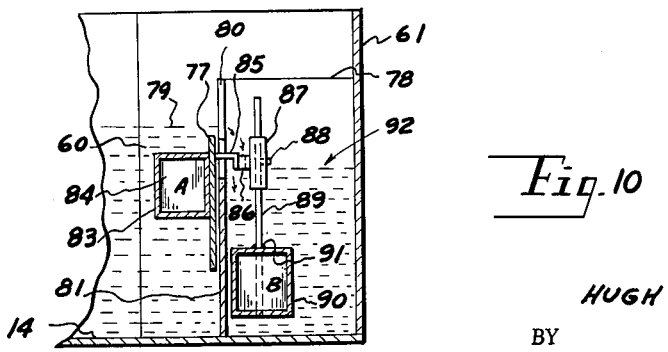
FIG. 10 is a fragmentary section taken on line 10—10 of FIG. 9 illustrating the construction of the automatic skimmer assembly.

For this purpose there is provided an automatic skimmer assembly, best shown in FIGS. 8, 9 and 10. Skimmer housing 78 was provided for this purpose, arranged upon the interior of the outlet box 61. The said skimmer housing includes the wall portion 80 and the depressed partition wall 81, which terminates below the fluid level, shown in FIG. 9 and has formed centrally thereof and at the upper portion of said partition wall a slot 82. The top surface fluids 79 from the said outlet box flow over the dam 77 into the skimmer housing 78 collecting at 92, FIG. 8 and are withdrawn from the said housing through the outlet pipe 76 which joins the suction T 73, FIG. 1.

An elongated hollow, vertically adjustable float dam A, also indicated at 83, FIG. 10, is arranged adjacent the outer surface of partition wall 81, and is for the purpose of controlling the flow of skimmed fluid over the elongated top edge of dam 77 depending upon the vertical positioning of said float A. Upright dam plate 77 is secured to the front upright wall of said float and extends thereabove as shown in FIG. 10, providing a dam. Dam plate 77 also extends below float A and guidably engages partition wall 81.

The float A is buoyant, as indicated by the air chamber 84, and by means of the connector 85 which extends through the slot 82, is connected to a second float 90, also indicated at B, FIG. 10.

The second float is arranged upon the interior of the skimmer housing 78 adjacent the partition 81 and normally spaced above the bottom of the skimmer housing. Bracket 85 includes the extensions 86, FIG. 8, which terminate in the sleeves 87, adjustably mounted upon the uprights 89, whose lower ends are secured as at 91 to the top surface of the float 90, FIG. 10. A suitable set screw 88 is provided in conjunction with the sleeves 87 for providing an adjustable relationship between the two floats 83 and 90. Accordingly the floats 83 and 90 once interconnected and adjusted with respect to each other are adapted for movement in unison.

The primary purpose of the second float 90 is for sensing the fluid level 92 within the skimmer housing, shown in FIG. 10. As the fluid or water in the float control box or skimmer housing 78 rises as at 92, float B will raise the float 83 and connected dam 77 so as to slow down or stop the skimming flow of fluid over dam 77 until the fluid at 92 in the skimmer housing has dropped to a preset level.

At this time the float B will lower and cause the dam 77 to lower and allow as much water to be skimmed thereover from the outlet housing 61 as the drain 76 in the skimmer housing will handle.

Accordingly the said second float B is capable of sensing the fluid level 92 of the skimmed fluid within the skimmer housing and will move automatically upward when the fluid level 92 within the skimmer housing approaches a determined high relative to the fluid level 79 within the outlet box 61 causing a corresponding upward movement of the float dam 77 for slowing down the amount of fluid which is skimmed over the dam.

Accordingly also the float B will automatically move downwardly when the fluid level 92 approaches or reaches a determined low point and there will be a consequent and corresponding movement in unison of the float dam 77 to thus permit an increase of the simmer flow of fluid over the dam into the skimmer housing and for recirculation back to the filter housing through the outlet 76 into the suction T 73 and through pipe 74.

Referring to FIGS. 1 and 3, there is a branch fluid pipe 93 which connects the additional T fitting 93' on pipe 65 for supplying fluid under pressure to the interior of the filter housing at one end thereof just above the level of fluid 12, as indicated in FIG. 2, the said pipe 93 extending through the said housing and being closed at its outer end at 94, FIGS. 2 and 3. The said pipe is arranged adjacent base portions of and directly above the sprocket chains 30, above the fluid level and have jet outlets 94' for the purpose of further washing the sprocket chains as they leave the fluid and more upwardly for the purpose of removing particles of dirt or impurities which may have accumulated thereon.

*Reciprocating air knife for cleaning filter screen*

One of the primary objects of the present invention is to provide a means for removing impurities and substances from the filter screen, after it has left the sprockets 47 with the screen moving in a clockwise direction, as indicated in FIG. 2. There is provided within the housing apertured bottom wall portion 22 and directly therebelow there is provided a removable sludge container 24, which is adapted to collect impurities which are to be blown from or otherwise removed from the outer surface of the material for the purpose of blowing off impurities, paint filter screen, as best shown in FIG. 2.

Various means have been employed for removing this material for the purpose of blowing off impurities, paint sludge or other material, some of which have been costly. The present invention contemplates the employment of a reciprocating air knife construction whereby at least a pair of longitudinally spaced air jet nozzles are employed at 108, FIG. 4, for illustration, and which are adapted to move transversely across the entire width of the filter screen 45. For this purpose there is provided an air cylinder 95, FIGS. 3 and 4, which is arranged upon the interior of the filter housing 13 and between upper and lower portions of the filter screen and suitably secured as at 96 to one of the side walls of the said filter housing.

The air cylinder 95 has reciprocating piston rod 97 which is spaced between and parallel to upper and lower portions of the screen, projects outwardly from the filter housing and at its end portion has secured thereto the lower end of the bracket assembly 99, best shown in FIGS. 4 and 4A.

The construction of the reciprocal air knife assembly includes transversely arranged longitudinally reciprocal air pipe 105, which extends through the filter housing and is guidably mounted upon a pair of laterally extending aligned support bars 100 anchored to the filter housing at 101, FIG. 4. The bracket assembly 99 includes a pair of plates which are suitably interconnected as at 104 and includes a series of vertically spaced rollers 102 and 103. These operatively and cooperatively engage upper and lower edge portions of the guide support bars 100 by which the longitudinally spaced pair of brackets 99 are slidably and movably mounted upon the individual support bars 100, best shown in FIG. 4.

The reciprocal air pipe 105 which is closed at one end at 106 and joined to a source of air under pressure at 107, FIG. 4 is intermediate its ends secured respectively to upper portions of each of the brackets 99, as by suitable fasteners 104. Accordingly a means is provided for effecting reciprocal movements of the air pipe 105, which carries upon its undersurface a pair of longitudinally spaced blowoff headers 108 with jet outlets 109. These are spaced closely above the lower portion of the filter screen 45 and transversely movable across its entire surface for the purpose of blowing off particles which have collected thereon which particles drop down into the sludge receptacle 24 shown in FIG. 2.

A suitable reciprocating air control unit is generally indicated in FIG. 3 at 110 and includes an automatic control valve 111 supplied air under pressure at 112 and adapted for the alternate delivery and exhausting of air to opposite ends of cylinder 95 by means of control valves 113 and 114, which are alternately operated by the cam surfaces 116 which form a part of the bracket 99, shown in FIG. 3.

The valve 111 has a pair of outlet pipes 117 and 118, which are respectively connected to opposite ends of the air cylinder 95 to thus provide a means for energizing said cylinder and for effecting continuous reciprocal movements of the piston rod 97 which extends therefrom. Accordingly, the said piston rod through the bracket 98–99, effects reciprocal movements of the air pipe 105 which carries the spaced blowoff headers 108 with jet outlets 109 best shown in FIG. 4.

During the operation of the present filter screen assembly, the air knife assembly including the blowoff headers 108 are continuously operable and are sweeping transversely at all times across the width of the screen.

A flushing header above described is furthermore employed for cleaning the filter screen and consists as above described of the water pipe 68, shown in FIG. 2 and FIG. 1, which has a series of jet outlets 71, best shown in FIG. 2 by which the filter screen before entry into the fluid 12 may be additionally washed down to complete the filter screen cleaning operation.

As shown in FIG. 3, the reciprocating air control unit is enclosed within the chamber housing 119 mounted upon one of the side walls of the housing 13 of the filter screen assembly.

As shown in FIG. 2, as well as FIG. 3, there are provided a pair of lubricating cups or storage chambers 120 with conduits 121 extending therefrom, which at their free ends at 122, FIG. 2 provide limited amounts of lubricant to the respective sprocket chains 30.

While the reciprocating pipe 105 has been described as an air pipe connected to a source of air under pressure at 107, it is contemplated that any other fluid under pressure could be used for cleaning the filter screen, such as steam or a cleaning solution.

Having described my invention, reference should now be had to the following claims.

I claim:

1. In an automatic filter screen;
a tank receiving fluid containing impurities to be filtered;
said fluid maintaining a fluid level in the tank, a filter housing communicating with the tank including opposed side walls extending above the tank;
oppositely arranged continuous guide flanges mounted on and projecting inwardly from each side wall defining opposed looped guides above the tank with portions extending below said level of fluid in the tank;
a power driven means within said housing, a continuous sprocket chain movably mounted on and around each flange and said driven means;
a continuous screen of loop form corresponding to said chains with its edges overlapping said flanges respectively and secured to corresponding portions of said chains for movement therewith;
an outlet in one side wall below the fluid level for delivering filtered fluid from the interior of said screen, an outlet box on the outside of the filter housing communicating with the fluid outlet and having an outlet adjacent the bottom thereof, and a skimmer housing within said outlet box including a partition wall, the upper portion of said partition wall being apertured defining a skimming inlet for the flow of top surface fluids from said outlet box into said skimmer housing, an outlet pipe adjacent the bottom of said skimmer housing for draining the fluid therein for delivery into said filter housing for recirculating through said filter screen.

2. In the filter screen of claim 1, a vertically adjustable first float in said outlet box adjacent said partition wall;
an upright dam mounted on said first float for controlling the flow of fluid through said skimmer inlet, the fluid collected in said skimmer housing providing a controlled fluid level;
a second float within and adjacent the bottom of said skimmer housing for sensing the control fluid level therein, automatically movable upwardly when said control fluid level approaches a determined high relative to the fluid level in the outlet box and automatically movable downwardly when said control fluid level approaches a determined low relative to the fluid level in the outlet box;
and means adjustably interconnecting said floats for movement in unison.

3. In the filter screen of claim 1, a vertically adjustable first float in said outlet box adjacent said partition wall;
an upright dam mounted on said first float for controlling the flow of fluid through said skimmer inlet, the fluid collected in the skimmer housing providing a controlled fluid level;
a second float within and adjacent the bottom of said skimmer housing for sensing the control fluid level therein, automatically movable upwardly when said control fluid level approaches a determined high relative to the fluid level in the outlet box and automatically movable downwardly when said control fluid level approaches a determined low relative to the fluid level in the outlet box;
and means adjustably interconnecting said floats for movement in unison.

4. In an automatic filter screen;
a tank receiving fluid containing impurities to be filtered;
said fluid maintaining a fluid level in the tank, a filter housing communicating with the tank including opposed side walls extending above the tank;
oppositely arranged continuous guide flanges mounted on and projecting inwardly from each side wall defining opposed looped guides above the tank with portions extending below said level of fluid for the tank;
a power driven means within said housing, a continuous sprocket chain movably mounted on and around each flange and said driven means;
a continuous screen of loop form corresponding to said chains with its edges overlapping said flanges respectively and secured to corresponding portions of said chains for movement therewith;
an outlet in one side wall below the fluid level for delivering filtered fluid from the interior of said screen, an outlet box on the outside of the filter housing communicating with the fluid outlet and having an outlet adjacent the bottom thereof, a skimmer housing within said outlet box including a partition wall, the upper portion of said partition wall being apertured defining a skimming inlet for the flow of top surface fluids from said outlet box into said skimmer housing, an outlet pipe adjacent the bottom of said skimmer housing for draining the fluid therein, a fluid pipe extending into said filter housing and at one end connected to a source of fluid under pressure, a suction T connection in said pipe, the outlet pipe from the skimmer housing joined to said suction T.

5. In an automatic filter screen;
a tank receiving fluid containing impurities to be filtered, said fluid maintaining a fluid level in the tank;
a filter housing communicating with the tank including opposed side walls extending above the tank;
oppositely arranged continuous guide flanges mounted on and projecting inwardly from each side wall defining opposed looped guides above the tank with portions extending below said level of fluid in the tank;

a power driven means within said housing, a continuous sprocket chain movably mounted on and around each flange and said driven means;

a continuous screen of loop form corresponding to said chains with its edges overlapping said flanges respectively and secured to corresponding portions of said chains for movement therewith;

an outlet in one side wall below the fluid level in the tank for delivering filtered fluid from the interior of said screen;

an outlet box on the outside of the filter housing communicating with the fluid outlet and having an outlet adjacent the bottom thereof, the fluid level in the outlet box corresponding substantially to the fluid level within the tank;

a skimmer housing within said outlet box including a partition wall, the upper portion of said partition wall being apertured defining a skimming inlet for the flow of top surface fluids from said outlet box into said skimmer housing, the fluid collected in said skimmer housing providing a control fluid level;

an outlet pipe adjacent the bottom of said skimmer housing for draining the fluid therein;

a fluid pipe extending into said filter housing and at one end connected to a source of fluid under pressure;

a suction T connection in said pipe, the outlet pipe from the skimmer housing joined to said suction T;

a vertically adjustable first float in said outlet box adjacent said partition wall;

an upright dam mounted on said first float for controlling the flow of fluid through said skimmer inlet;

a second float within and adjacent the bottom of said skimmer housing and adjacent said partition for sensing the control fluid level therein, automatically movable upwardly when said control fluid level approaches a determined high relative to the fluid level in the outlet box and automatically movable downwardly when said control fluid level approaches a determined low relative to the fluid level in the outlet box;

and means adjustably interconnecting said floats for movement in unison.

6. In combination, an outlet box adapted for connection to a supply of fluid and having an outlet adjacent the bottom thereof, the fluid on the outlet box maintaining a fluid level;

a skimmer housing within said outlet box including a partition wall, the upper portion of said partition wall being apertured defining a skimming inlet for the flow of top surface fluids from said outlet box into said skimmer housing;

an outlet pipe adjacent the bottom of said skimmer housing for draining the fluid therein, the fluid collected in the skimmer housing defining a control fluid level;

a vertically adjustable float in said outlet box adjacent said partition wall;

an upright dam mounted on said first float for controlling the flow of fluid through said skimmer inlet;

a second float within and adjacent the bottom of said skimmer housing for sensing the control fluid level therein, automatically movable upwardly when said control fluid level approaches a determined high relative to the fluid level in the outlet box and automatically movable downwardly when said control fluid level approaches a determined low relative to the fluid level in the outlet box;

and means adjustably interconnecting said floats for movement in unison.

7. In an automatic filter screen;

a tank receiving fluid containing impurities to be filtered;

said fluid maintaining a fluid level in the tank;

a filter housing communicating with the tank including opposed side walls extending above the tank;

oppositely arranged continuous guide flanges mounted on and projecting inwardly from each side wall defining opposed looped guides above the tank with portions extending below said level of fluid in tank;

a power driven means within said housing, a continuous sprocket chain movably mounted on and around each flange and said driven means;

a continuous screen of loop form corresponding to said chains with its edges overlapping said flanges respectively and secured to corresponding portions of said chains for movement therewith;

and an outlet in one side wall below the fluid level on the tank for delivering filtered fluid from the interior of said screen;

each chain including a series of aligned pivotally interconnected segments, some of said pivotal connections including pins extending laterally inwardly of said chain terminating in outwardly bent radial supports;

and a series of longitudinally spaced apertured grommets mounted and secured through said screen along and adjacent its edges, the securing of said screen to said chains including said grommets mounted respectively over said pin radial supports.

8. In the filter screen of claim 7, a sealing bar mounted on and projecting radially outward from the inner edge of each flange, the outer edge portions of said screen operatively bearing against a sealing bar respectively.

9. In the filter of claim 7, an elongated guard rail spaced inwardly from and parallel to and mounted on each side wall including a continuous bottom edge radially spaced from said flanges respectively and outwardly of their edges, said pins retainingly and slidably engaged by said bottom edge for holding said chains respectively on said flanges, and a sealing bar mounted on and projected radially outward from the inner edge of said flanges, the outer edge portions of said screen operatively bearing against a sealing bar respectively.

10. In the filter of claim 7, an elongated guard rail spaced inwardly from and parallel to and mounted on each side wall including a continuous bottom edge radially spaced from said flanges respectively and outwardly of their edges, said pins retainingly and slidably engaged by said bottom edge for holding said chains respectively on said flanges, and a sealing bar mounted on and projected radially outward from the inner edge of said flanges, the outer edge portions of said screen operatively bearing against a sealing bar respectively;

some of said chain segments including connector links having a radial projection slidably bearing against the outer surface of said guard rail, retaining said chains respectively in a continuous outermost planar position holding the edges of said screen taut.

11. In an automatic filter screen;

a tank receiving fluid containing impurities to be filtered;

said fluid maintaining a fluid level in the tank;

a filter housing communicating with the tank including opposed side walls extending above the tank;

oppositely arranged continuous guide flanges mounted on and projecting inwardly from each side wall defining opposed looped guides above the tank with portions extending below said level of fluid in tank;

a power driven means within said housing, a continuous sprocket chain movably mounted on and around each flange and said driven means;

a continuous screen of loop form corresponding to said chains with its edges overlapping said flanges respectively and secured to corresponding portions of said chains for movement therewith;

and an outlet in one side wall below the fluid level on the tank for delivering filtered fluid from the interior of said screen;

each chain including a series of aligned pivotally interconnected segments, some of said pivotal connections including pins extending laterally inward of said chain; and an elongated guard rail spaced inwardly from and parallel to and mounted on each side wall including a continuous bottom edge radially spaced from said flanges respectively and outwardly of their edges, said pins retainingly and slidably engaged by said bottom edge for holding said chains respectively on said flanges.

12. In the filter screen of claim 11, a sealing bar mounted on and projected radially outward from the inner edges of said flanges, the outer edge portions of said screen operatively bearing against a sealing bar respectively.

13. In the filter of claim 11, some of said chain segments including connector links having a radial projection slidably bearing against the outer surface of said guard rail, retaining said chains respectively in a continuous outermost planer position holding the edges of said screen taut.

14. In the filter of claim 11, some of said chain segments including connector links having a radial projection slidably bearing against the outer surface of said guard rail, retaining said chains respectively in a continuous outermost planer position holding the edge of said screen taut;

and a sealing bar mounted on and projecting radially outward from the inner edge of said flanges, the outer edge portions of said screen operatively bearing against a sealing bar respectively.

15. In an automatic filter screen, a tank receiving fluid containing impurities to be filtered;

said fluid maintaining a fluid level in the tank;

a filter housing communicating with the tank, including opposed side walls extending above the tank;

a pair of spaced upright power driven sprockets journaled within the housing adjacent its respective side walls above the tank;

oppositely arranged continuous guide flanges mounted on and projecting inwardly from each side wall defining opposed looped guides above the tank with portions extending below the fluid level in said tank, and with the respective ends of each flange spaced longitudinally of the top and bottom of a sprocket respectively;

a continuous sprocket chain movably and guidably mounted on and around each flange and a corresponding sprocket, a continuous screen in the form of a loop corresponding of said chains with its edges overlapping said flanges respectively and secured to corresponding portions of said chains for movement therewith;

and a fluid outlet in one side wall below the fluid level in the tank for delivering filtered fluid from the interior of said screen;

guide bars upon the housing side walls at right angles thereto, a closed pipe at one end connected to a source of air under pressure extending transversely through said housing above the fluid level and spaced between and parallel to upper and lower portions of said screen, said pipe mounted on said guide bars for reciprocal movement relative to and transversely of the length of said screen, a blowoff header connected to and depending from said pipe including an air jet nozzle positioned adjacent the screen for transverse sweeping movements thereacross, and a motor with a reciprocating rod joined to said pipe for effecting continuous reciprocal movements thereof.

16. In an automatic filter screen;
a tank receiving fluid containing impurities to be filtered;
said fluid maintaining a fluid level in the tank;
a filter housing communicating with the tank including opposed side walls extending above the tank;
oppositely arranged continuous guide flanges mounted on and projecting inwardly from each side wall defining opposed looped guides above the tank with portions extending below said level of fluid in tank;
a power driven means within said housing, a continuous sprocket chain movably mounted on and around each flange and said driven means;
a continuous screen of loop form corresponding to said chains with its edges overlapping said flanges respectively and secured to corresponding portions of said chains for movement therewith;
and an outlet in one side wall below the fluid level on the tank for delivering filtered fluid from the interior of said screen;
guide means upon the housing side walls, a closed pipe at one end connected to a source of fluid under pressure extending transversely through said housing above the fluid level and spaced between and parallel to upper and lower portions of said screen, said pipe mounted on said guide means for reciprocal movement relative to and transversely of the length of said screen, a blowoff header connected to and depending from said pipe including a jet nozzle positioned adjacent the screen for transverse sweeping movements thereacross, and a motor with a reciprocating rod joined to said pipe for effecting continuous reciprocal movements thereof, said guide means including a pair of laterally aligned support bars extending outwardly and normally of the side walls, the mounting of said pipe on said guide means including an upright bracket slidably mounted on each bar and fixedly secured to said pipe.

17. The filter of claim 16, said fluid being air, and rollers on said brackets operatively engaging said bars.

18. In an automatic filter screen;
a tank receiving fluid containing impurities to be filtered;
said fluid maintaining a fluid level in the tank;
a filter housing communicating with the tank including opposed side walls extending above the tank;
oppositely arranged continuous guide flanges mounted on and projecting inwardly from each side wall defining opposed looped guides above the tank with portions extending below said level of fluid in tank;
a power driven means within said housing, a continuous sprocket chain movably mounted on and around each flange and said driven means;
a continuous screen of loop form corresponding to said chains with its edges overlapping said flanges respectively and secured to corresponding portions of said chains for movement therewith;
and an outlet in one side wall below the fluid level on the tank for delivering filtered fluid from the interior of said screen;
guide bars upon the housing side walls at right angles thereto;
a closed pipe at one end connected to a source of air under pressure extending transversely through said housing above the fluid level and spaced between and parallel to upper and lower portions of said screen;
said pipe mounted on said guide bars for reciprocal movement relative to and transversely of the length of said screen;
a blowoff header connected to and depending from said pipe including an air jet nozzle positioned adjacent the screen for transverse sweeping movements thereacross, and power means joined to said pipe for effecting continuous reciprocal movements thereof;
the power means joined to said pipe including an air cylinder mounted on said housing with its axis parallel to said air pipe;
and a reciprocal piston rod projecting from said cylinder and at its end portion fixedly secured to said air pipe for movement in unison therewith.

19. In the filter of claim 18, a control valve mounted on said housing connected to a source of fluid under pressure, conduits interconnecting opposite ends of said cylinder with said valve for alternately delivering pressure fluid to opposite ends of the cylinder, and an automatically movable valve element in said valve for effecting continuous reciprocal movements of said piston rod.

References Cited by the Examiner

UNITED STATES PATENTS

| | | | |
|---|---|---|---|
| 840,446 | 1/1907 | Ertheiler | 198—194 X |
| 1,194,250 | 8/1916 | Smits | 210—160 X |
| 1,661,657 | 3/1928 | Grabill | 198—194 X |
| 2,343,179 | 2/1944 | Hauck | 210—525 X |
| 2,619,232 | 11/1952 | Parsons | 210—400 X |
| 2,839,970 | 6/1958 | Gaffney | 209—380 |
| 2,885,080 | 5/1959 | Goldman | 210—160 |
| 3,039,610 | 6/1962 | Black | 210—391 X |
| 3,091,335 | 5/1963 | Goard | 210—401 X |

FOREIGN PATENTS 192,333   2/1923   Great Britain.

REUBEN FRIEDMAN, *Primary Examiner.*

F. W. LUTTER, *Examiner.*